US012543745B2

(12) United States Patent
Froelicher

(10) Patent No.: US 12,543,745 B2
(45) Date of Patent: Feb. 10, 2026

(54) CATALYST ASSEMBLY FOR AN INDOOR PIZZA OVEN APPLIANCE

(71) Applicant: Haier US Appliance Solutions, Inc., Wilmington, DE (US)

(72) Inventor: Stephen Bernard Froelicher, Shepherdsville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 404 days.

(21) Appl. No.: 18/176,134

(22) Filed: Feb. 28, 2023

(65) Prior Publication Data

US 2024/0284919 A1 Aug. 29, 2024

(51) Int. Cl.

| | |
|---|---|
| ***A21B 1/14*** | (2006.01) |
| ***A21B 3/04*** | (2006.01) |
| ***A21B 5/00*** | (2006.01) |
| ***F24C 15/20*** | (2006.01) |

(52) U.S. Cl.

CPC .................. *A21B 1/14* (2013.01); *A21B 3/04* (2013.01); *A21B 5/00* (2013.01); *F24C 15/2014* (2013.01)

(58) Field of Classification Search

None

See application file for complete search history.

(56) References Cited

U.S. PATENT DOCUMENTS

| | | | | |
|---|---|---|---|---|
| 3,413,444 | A * | 11/1968 | Heit | G05D 23/1913 219/393 |
| 4,481,404 | A * | 11/1984 | Thomas | F24C 14/02 219/393 |
| 9,683,747 | B2 | 6/2017 | Raghavan et al. | |
| 9,888,692 | B2 | 2/2018 | Froelicher et al. | |
| 10,976,059 | B2 | 4/2021 | Artt | |
| 2008/0017183 | A1 | 1/2008 | Aonuma | |
| 2018/0020680 | A1* | 1/2018 | Froelicher | F24C 15/32 126/21 A |
| 2021/0108810 | A1* | 4/2021 | Benedek | F24F 8/10 |
| 2022/0133942 | A1* | 5/2022 | Benedek | A61L 9/205 422/121 |

FOREIGN PATENT DOCUMENTS

| | | | | |
|---|---|---|---|---|
| CN | 214017185 | U | 8/2021 | |
| DE | 19706186 | A1 * | 8/1998 | F24C 14/02 |
| EP | 2708128 | A2 * | 3/2014 | F24C 15/325 |

* cited by examiner

*Primary Examiner* — Jorge A Pereiro

(74) *Attorney, Agent, or Firm* — Dority & Manning, P.A.

(57) ABSTRACT

An oven appliance includes a housing defining a discharge vent, a cooking chamber positioned within the housing, an exhaust duct providing fluid communication between the cooking chamber and the discharge vent, an air handler operably coupled with the exhaust duct for urging a flow of heated air from the cooking chamber, through the exhaust duct, and out of the discharge vent, and a catalytic converter assembly. The catalytic converter assembly includes a catalytic element positioned within the exhaust duct for lowering volatile organic compounds from the flow of heated air and a catalyst heater positioned upstream of the catalytic element for selectively heating the flow of heated air.

17 Claims, 6 Drawing Sheets

CATALYST ASSEMBLY FOR AN INDOOR PIZZA OVEN APPLIANCE

FIELD OF THE INVENTION

The present subject matter relates generally to indoor pizza oven appliances, and more particularly to smoke containment and suppression systems for indoor pizza ovens.

BACKGROUND OF THE INVENTION

Pizza ovens generally include a housing that defines a cooking chamber for receiving a pizza for cooking. Heating elements, such as gas burners or burning wood, heat the cooking chamber to a suitable temperature. Certain pizza ovens operate at high temperatures. For example, the operating temperatures of such pizza ovens can be higher than five hundred degrees Fahrenheit.

Conventional pizza ovens include a baking stone or cooking deck on which food items (such as pizzas) are directly placed during the cooking process. As a result, cooking fumes, smoke, volatile organic compounds (VOCs), and/or other visible emissions may be generated during the cooking process, and it may be desirable to vent these byproducts into the surrounding area. In order to achieve suitable venting, certain oven installations include a venting duct that extends from the pizza oven to an exterior of a building housing the pizza oven such that the venting duct directs heat, cooking fumes, and smoke from the pizza oven to the outside. However, exterior discharge of heat and smoke is not always practical or feasible, and venting ducts can be expensive to install and/or maintain. Thus, pizza ovens are generally uneconomical for indoor residential installation.

Accordingly, a pizza oven with features for venting a cooking chamber of the pizza oven to an interior of a building housing the pizza oven would be useful. More specifically, a pizza oven with features for venting a cooking chamber of the pizza oven while reducing or eliminating visible VOCs would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, an oven appliance defining a vertical direction, a lateral direction, and a transverse direction is provided. The oven appliance includes a housing defining a discharge vent, a cooking chamber positioned within the housing, an exhaust duct providing fluid communication between cooking chamber and the discharge vent, an air handler operably coupled with the exhaust duct for urging a flow of heated air from the cooking chamber, through the exhaust duct, and out of the discharge vent, and a catalytic converter assembly. The catalytic converter assembly includes a catalytic element positioned within the exhaust duct for lowering volatile organic compounds from the flow of heated air and a catalyst heater positioned upstream of the catalytic element for selectively heating the flow of heated air.

In another exemplary embodiment, a method of operating an oven appliance is provided. The oven appliance includes a cooking chamber, an exhaust duct fluidly coupled to the cooking chamber, an air handler operably coupled with the exhaust duct, a catalytic element positioned within the exhaust duct, and a catalyst heater positioned upstream of the catalytic element. The method includes obtaining a temperature setting of the oven appliance and adjusting operation of the catalyst heater based on the temperature setting.

In yet another exemplary embodiment, a method of operating an oven appliance is provided. The oven appliance includes a cooking chamber, an exhaust duct fluidly coupled to the cooking chamber, an air handler operably coupled with the exhaust duct, a catalytic element positioned within the exhaust duct, and a catalyst heater positioned upstream of the catalytic element. The method includes detecting a level of volatile organic compounds (VOCs) in the flow of heated air or a temperature of the flow of heated air and adjusting operation of the catalyst heater based on the level of volatile organic compounds (VOCs) in the flow of heated air or the temperature of the flow of heated air.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
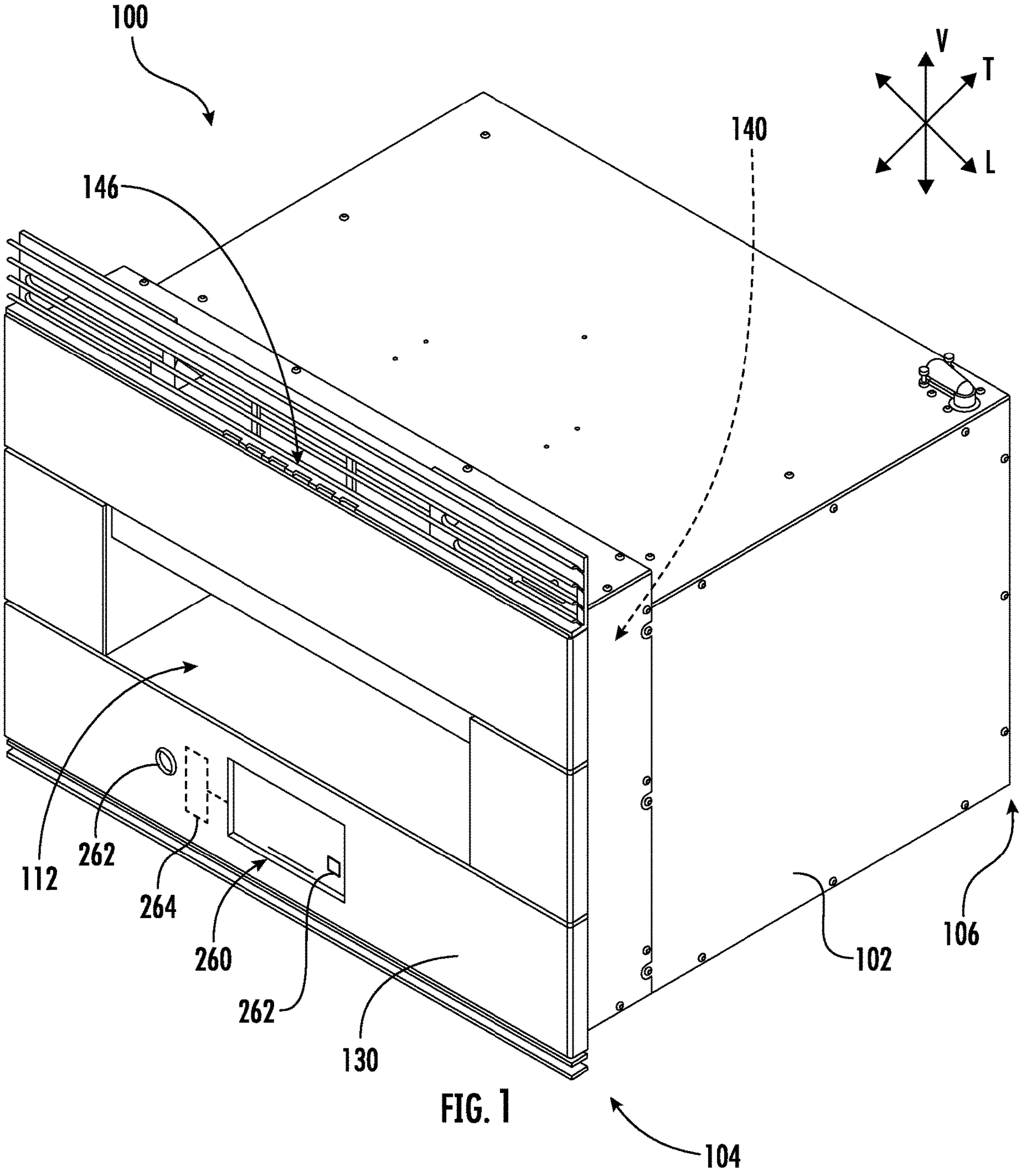
FIG. 1 provides a front, perspective view of an oven appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front, perspective view of an oven appliance 100, such as a pizza oven, according to an exemplary embodiment of the present subject matter. As illustrated, oven appliance 100 generally defines a vertical direction V, a lateral direction L, and a transverse direction T, each of which is mutually perpendicular, such that an orthogonal coordinate system is generally defined. According to exemplary embodiments, oven appliance 100 includes a housing 102 that is generally configured for containing and/or supporting various components of oven appliance 100 and which may also define one or more internal chambers or compartments of oven appliance 100. In this regard, as used herein, the terms "cabinet," "housing," and the like are generally intended to refer to an outer frame or support structure for oven appliance 100, e.g., including any suitable number, type, and configuration of support structures formed from any suitable materials, such as a system of elongated support members, a plurality of interconnected panels, or some combination thereof. It should be appreciated that housing 102 does not necessarily require an enclosure and may simply include open structure supporting various elements of appliance 100. By contrast, housing 102 may enclose some or all portions of an interior of housing 102. It should be appreciated that housing 102 may have any suitable size, shape, and configuration while remaining within the scope of the present subject matter.

As illustrated, housing 102 generally extends between a top portion and a bottom portion along the vertical direction V, between a first side (e.g., the left side when viewed from the front as in FIG. 1) and a second side (e.g., the right side when viewed from the front as in FIG. 1) along the lateral direction L, and between a front portion 104 and a rear portion 106 along the transverse direction T. In general, terms such as "left," "right," "front," "rear," "top," or "bottom" are used with reference to the perspective of a user accessing appliance 100. Various features of oven appliance 100 are discussed in greater detail below in the context of FIGS. 1 through 4.

Figure 2:
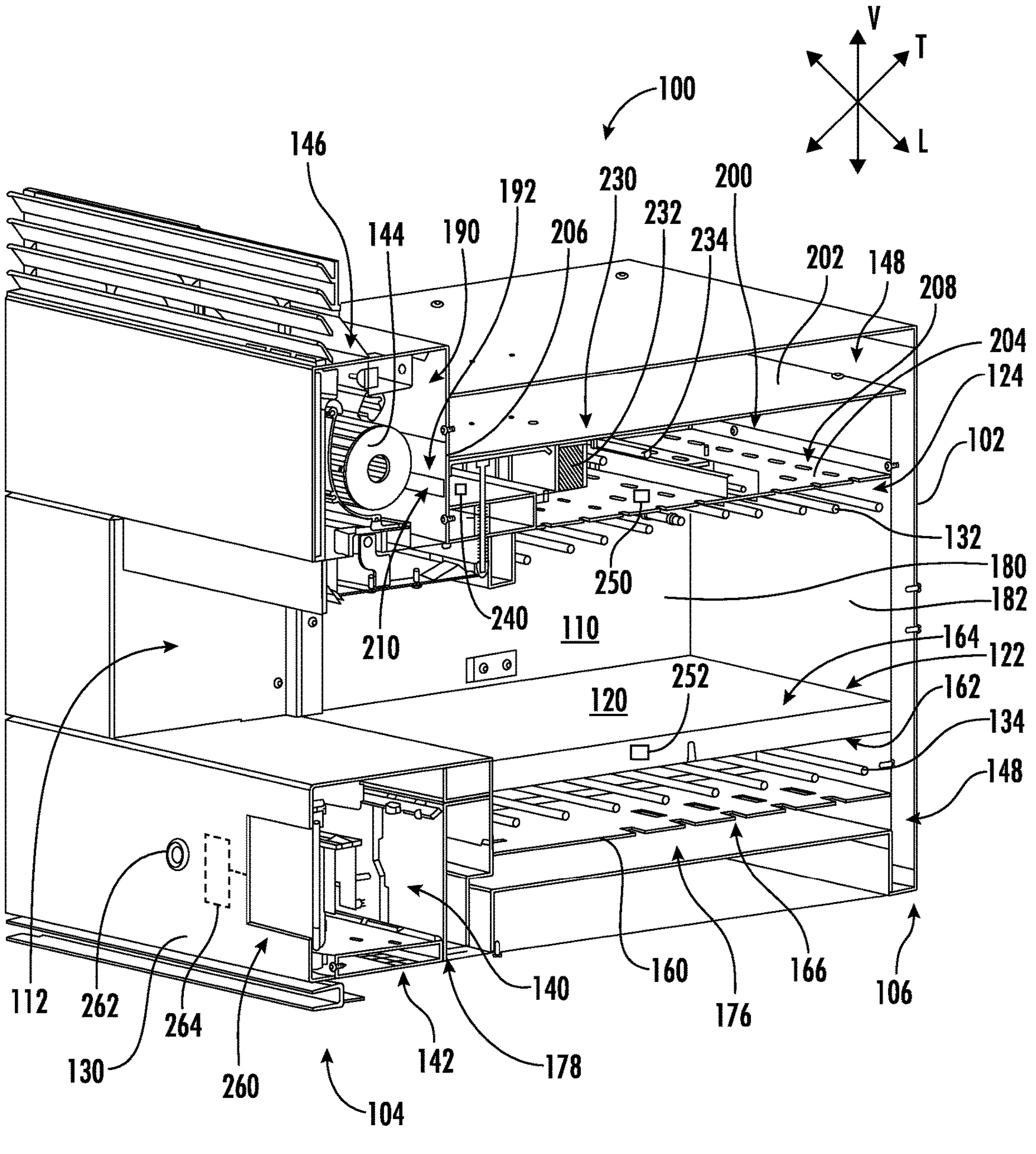
FIG. 2 provides a cross-sectional view of the exemplary oven appliance of FIG. 1 according to an exemplary embodiment of the present subject matter.
Figure 3:
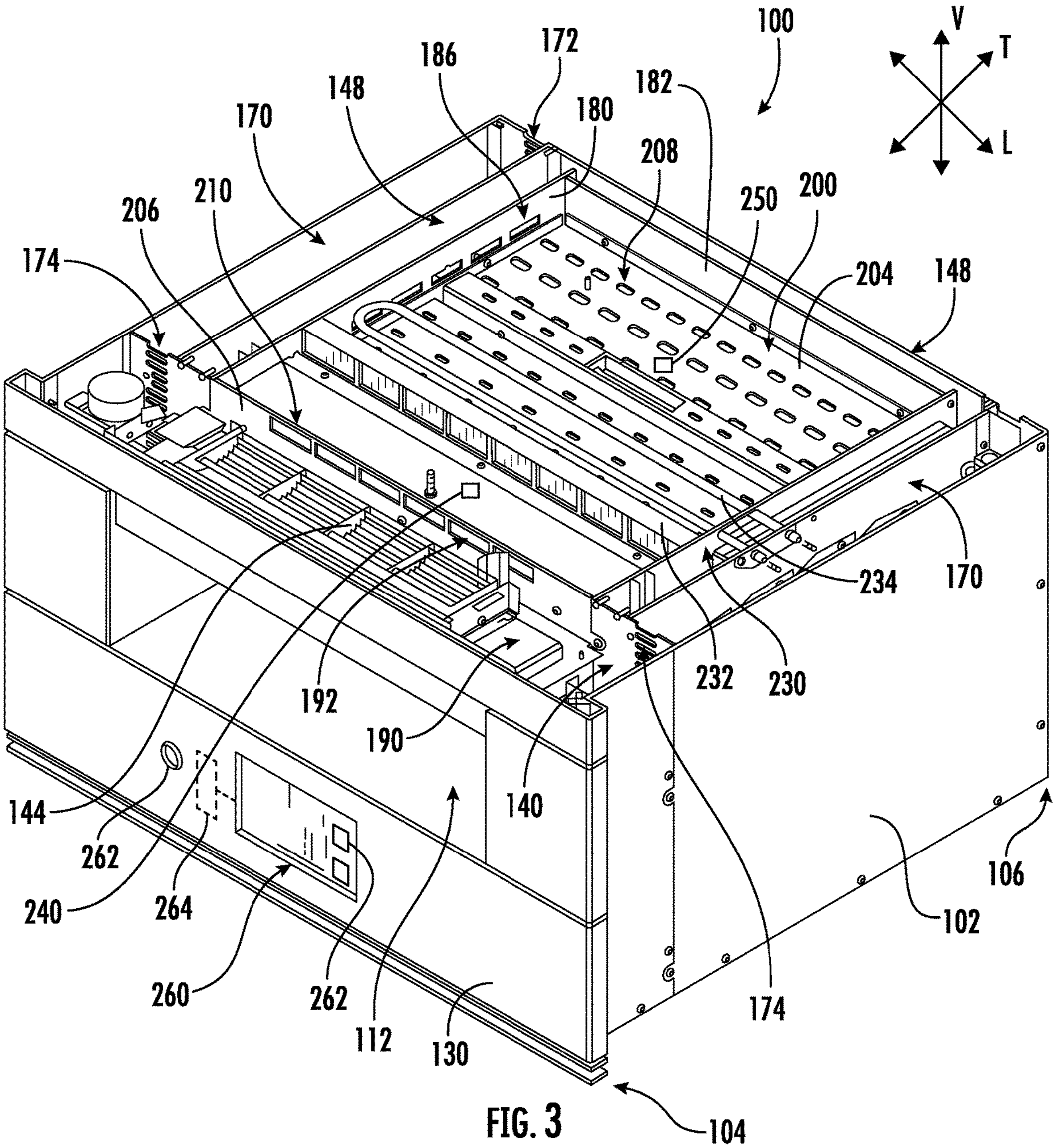
FIG. 3 provides a cross-sectional view of the exemplary oven appliance of FIG. 1 according to an exemplary embodiment of the present subject matter.
Figure 4:
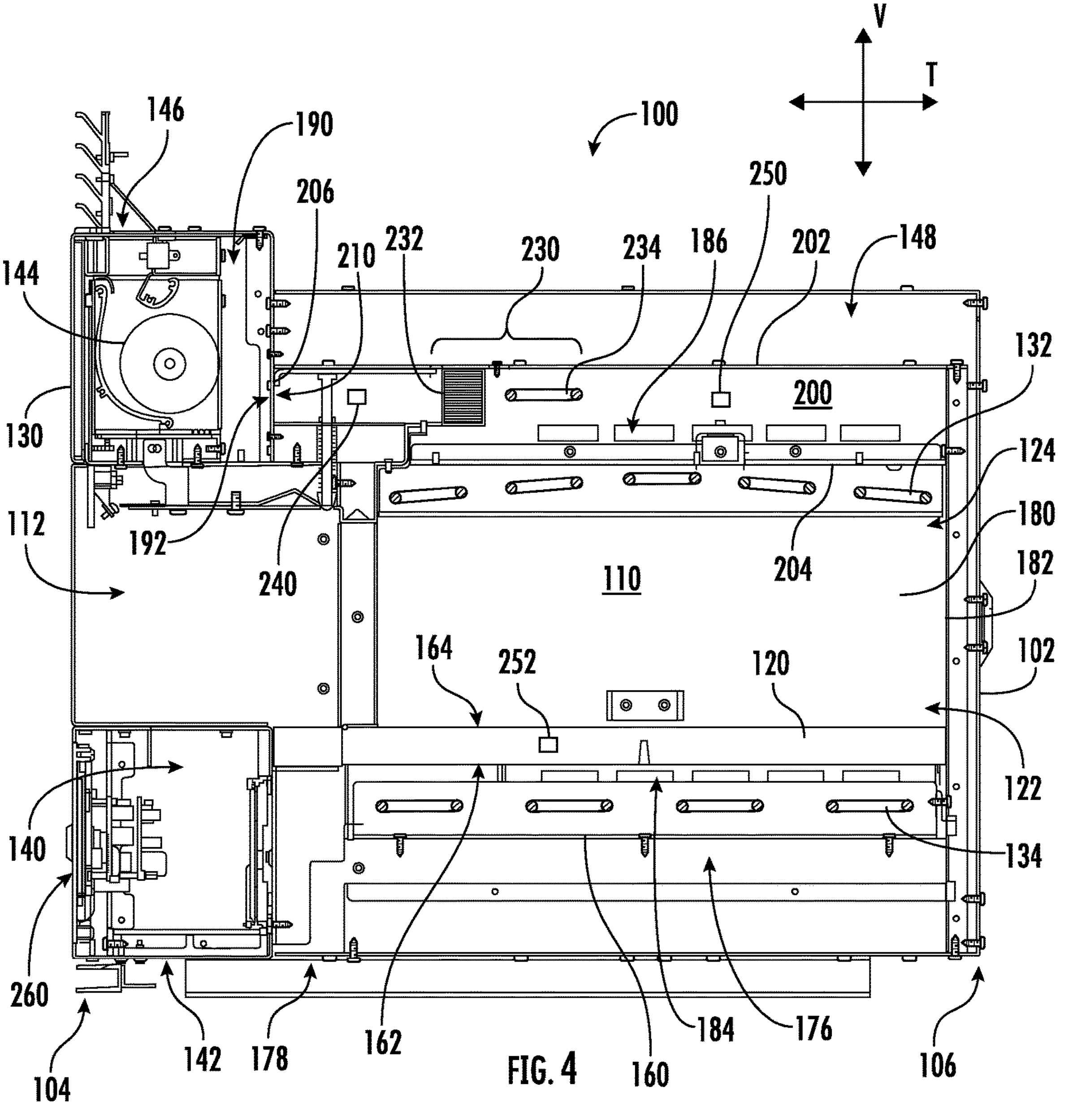
FIG. 4 provides a side section view of the exemplary oven appliance of FIG. 1 according to an exemplary embodiment of the present subject matter.

As may be seen in FIGS. 2 through 4, housing 102 of oven appliance 100 defines a cooking chamber 110 that is configured for receiving food items for cooking therein. In particular, housing 102 also defines an opening 112 for accessing cooking chamber 110. Opening 112 is positioned at a front portion 104 of housing 102, and a user of oven appliance 100 may place food items into and remove food items from cooking chamber 110 via opening 112. As may be seen in FIG. 1, cooking chamber 110 is open such that cooking chamber 110 is contiguous with or exposed to interior room ambient atmosphere about oven appliance 100, e.g., about housing 102, via opening 112. Thus, oven appliance 100 does not include a door positioned at opening 112 for sealing opening 112 during normal operation of oven appliance 100.

A baking stone 120 is positioned within housing 102 at a bottom portion 122 of cooking chamber 110. Thus, baking stone 120 may form at least a portion of a floor of cooking chamber 110. Food items, such as pizza, may be placed directly on baking stone 120 during operation of oven appliance 100, as will be understood by those skilled in the art. Baking stone 120 may be constructed of or with any suitable material. For example, baking stone 120 may be constructed of or with a ceramic, clay, steel, or stone. In particular, baking stone 120 may be constructed of or with a porous ceramic or porous stone.

Oven appliance 100 also includes a manifold or casing 130. Casing 130 is mounted to housing 102 at opening 112 of housing 102. In particular, as shown in FIG. 1, casing 130 may extend about opening 112 of housing 102. Thus, a user may reach through opening 112 into cooking chamber 110 at casing 130. Casing 130 may have any suitable shape and/or appearance. For example, casing 130 may be rectangular with flat elements as shown in FIG. 1. In alternative exemplary embodiments, casing 130 may include column shaped elements, rounded elements, etc. Casing 130 may be formed of or with any suitable material. For example, an outer surface of casing 130 may be constructed of or with stainless steel, painted steel, enameled steel, copper or combinations thereof.

Oven appliance 100 includes heating element arrays for heating cooking chamber 110 and food items therein. In particular, an upper heating element array 132 is positioned within housing 102 at a top portion 124 of cooking chamber 110. In addition, a lower heating element array 134 is positioned within housing 102 below baking stone 120 adjacent bottom portion 122 of cooking chamber 110. Thus, lower heating element array 134 may not be directly exposed to cooking chamber 110, and baking stone 120 may be positioned between cooking chamber 110 and lower heating element array 134, e.g., along the vertical direction V. Upper and lower heating element arrays 132, 134 are electrical heating element arrays. In certain exemplary embodiments, upper and lower heating element arrays 132, 134 are constructed of or with electrical resistance heating elements, such as calrods.

As discussed above, casing 130 is mounted to housing 102. As may be seen in FIGS. 2 through 4, casing 130 defines an air plenum 140. Thus, casing 130 may be hollow. Casing 130 also defines entrances 142, e.g., at a bottom of casing 130. Entrances 142 are contiguous with ambient air about housing 102. Thus, ambient air about housing 102 may flow into air plenum 140 via entrances 142. In particular, an air handler 144, such as a cross flow fan, may operate to draw ambient air about housing 102 into air plenum 140 via entrances 142. Air handler 144 may be positioned within casing 130, e.g., at a top of casing 130 above opening 112. Utilizing air handler 144, air plenum 140 may be negatively pressurized relative to ambient air about housing 102. From air plenum 140, the air within air plenum 140 may be drawn from various parts of oven appliance 100, e.g., to assist with cooling oven appliance 100, to assist with regulating a temperature of baking stone 120 and/or to assist with drawing treating cooking fumes from cooking chamber 110 of housing 102, as discussed in greater detail below. In addition, according to example embodiments, casing 130 may define a discharge vent 146 defined at a top of casing 130 for discharging air from air plenum 140.

Oven appliance 100 includes various features for limiting or reducing heat transfer from cooking chamber 110 to surrounding cabinetry or to the external environment. For example, oven appliance 100 includes insulation cavities 148 within housing 102, e.g., such that housing 102 is an insulated housing. Insulation cavities 148 may be positioned between cooking chamber 110 and surrounding cabinetry and may be filled with a thermally insulating material.

Oven appliance 100 also includes a lower baffle plate 160 within housing 102. Lower baffle plate 160 is positioned within housing 102 below lower heating element array 134. Thus, lower baffle plate 160 limits or reduces heat transfer between lower heating element array 134 and a bottom of housing 102 or a floor of surrounding cabinetry. As may be seen in FIG. 2, lower baffle plate 160 is spaced apart from baking stone 120 along the vertical direction V. As discussed in greater detail below, lower baffle plate 160 also includes features for directing a flow of air through lower baffle plate 160 to lower heating element array 134 and/or a bottom surface 162 of baking stone 120.

In addition to passive insulating elements discussed above, oven appliance 100 also includes features for actively cooling oven appliance 100. In particular, housing 102 defines a cooling air duct 170, e.g., at a side of housing 102. Cooling air duct 170 may be positioned between cooking chamber 110 and an outer surface of housing 102, e.g., along the lateral direction L, as shown in FIG. 3. In addition, insulation cavities 148 of housing 102 may be positioned between cooling air duct 170 and cooking chamber 110 of housing 102, e.g., along the lateral direction L. As discussed in greater detail below, air flow though cooling air duct 170 may assist with limiting or reducing heat transfer from housing 102 to cabinetry in which oven appliance 100 is positioned.

Cooling air duct 170 includes an inlet 172 (or series of inlets) and an outlet 174 (or series of outlets). Inlet 172 of cooling air duct 170 is positioned at a rear portion 106 of housing 102 and outlet 174 of cooling air duct 170 is positioned at a front portion 104 of housing 102. Thus, inlet 172 and outlet 174 of cooling air duct 170 may be positioned opposite each other on housing 102 and spaced apart from each other, e.g., along the transverse direction T. As best shown in FIG. 3, outlet 174 of air duct 170 may be in fluid communication with air plenum 140, e.g., such that air handler 144 draws a flow of air through air duct 170 and into air plenum 140 for mixing with other flows of air within oven appliance 100. Air within cooling air duct 170 may assist with limiting or reducing heat transfer from housing 102 to surrounding cabinetry in which oven appliance 100 is positioned, as will be understood by those skilled in the art. An additional cooling air duct (similarly identified by reference numeral 170) may be positioned at an opposite side of housing 102. In this regard, these two lateral cooling air ducts 170 operate similarly and are spaced apart from each other, e.g., along the lateral direction, and cool opposite sides of housing 102.

Oven appliance 100 also includes features for regulating a temperature of baking stone 120. In particular, housing 102 also defines a regulating air duct 176, e.g., at a bottom portion of housing 102. As shown in FIG. 2, regulating air duct 176 includes an inlet 178 (or series of inlets) that are defined in a bottom wall of housing 102. Ambient air may flow into regulating air duct 176 through inlets 178 to facilitate temperature regulation of baking stone 120. Specifically, as best shown in FIG. 2, lower baffle plate 160 may define a plurality of holes 166 that are contiguous with regulating air duct 176 of housing 102. In particular, air from regulating air duct 176 may flow through holes 166 of lower baffle plate 160, through lower heating element array 134, and onto bottom surface 162 of baking stone 120. The air may flow along bottom surface 162 of baking stone 120 in order to assist with regulating a temperature of baking stone 120. According to example embodiments, inlet 178 of regulating air duct 176 (or any other orifice of regulating air duct 176) may be metered to regulate the flow of air through regulating air duct 176 to baking stone 120.

Holes 166 of lower baffle plate 160 may be distributed in any suitable manner relative to one another. For example, as shown in FIG. 2, holes 166 may be distributed such that more of the holes 166 are positioned below a rear half of baking stone 120 than below a front half of baking stone 120. In particular, no less than twice as many of the holes 166 may be positioned below the rear half of baking stone 120 than the front half of baking stone 120. Further, holes 166 positioned below the rear half of baking stone 120 may be distributed in a diamond or any other suitable pattern. Such distribution of holes 166 may assist with maintaining a uniform heat distribution at a top surface 164 of baking stone 120 while also limiting radiant heat transfer from lower heating element array 134 through lower baffle plate 160.

From baking stone 120, the air from holes 166 directed away from lower baffle plate 160. In particular, housing 102 includes a pair of side panels 180 and a rear panel 182. Side panels 180 are positioned at and may assist with defining cooking chamber 110 of housing 102. Side panels 180 may be positioned opposite each other about cooking chamber 110 of housing 102, e.g., such that side panels 180 are spaced apart from each other along the lateral direction L. Rear panel 182 is also positioned at and may assist with defining cooking chamber 110 of housing 102. Rear panel 182 is positioned adjacent rear position 106 of housing 102 and may extend between side panels 180, e.g., along the lateral direction L.

Side panels 180 and/or rear panel 182 define a plurality of inlet openings 184 and a plurality of outlet openings 186. As shown in FIG. 4, inlet openings 184 are positioned below baking stone 120 and above lower baffle plate 160, e.g., along the vertical direction V. Outlet openings 186 are positioned at and contiguous with cooking chamber 110 of housing 102. Outlet openings 186 may also be positioned above upper heating element array 132, e.g., along the vertical direction V. Inlet openings 184 are configured for receiving air from below baking stone 120, and outlet openings 186 are configured for directing the air into cooking chamber 110 of housing 102. Thus, from baking stone 120 and lower baffle plate 160, the flow of air from regulating air duct 176 may enter cooking chamber 110 of housing 102 and exit housing 102 via a discharge plenum 190, as discussed in greater detail below.

As shown in FIGS. 2 through 4, oven appliance 100 may further include an exhaust duct 200 that is defined at top portion 124 of cooking chamber 110. In this regard, according to the illustrated embodiment, exhaust duct 200 is defined between a top wall 202 of cooking chamber 110 and a perforated reflector 204 along the vertical direction V. In addition, exhaust duct 200 generally extends between side panels 180 along the lateral direction L and between rear panel 182 and a front wall 206 along the transverse direction T. According to the illustrated embodiments, upper heating element array 132 is positioned immediately below perforated reflector 204. In general, perforated reflector 204 may reflect radiant energy emitted by upper heating element array 132 downwardly along the vertical direction V back towards baking stone 120 and food items thereon.

In general, exhaust duct 200 provides a path for air within oven appliance 100 to be safely and efficiently discharged. In this regard, as explained below, exhaust duct 200 is in flow communication with various regions and passages within oven appliance 100 for collecting and discharging exhaust fumes, heated air, and other flows of air from within oven appliance 100, e.g., into the interior room ambient atmosphere about oven appliance 100. Although exemplary flow paths are described herein, it should be appreciated that variations and modifications to the flow paths may be made while remaining within the scope of the present subject matter.

As illustrated, exhaust duct 200 is configured for receiving heated air, cooking fumes, and/or smoke from cooking chamber 110 so that it may be safely discharged. In this regard, perforated reflector 204 may define a plurality of apertures 208 through which air from the cooking chamber may pass into exhaust duct 200. In addition, outlet openings 186 may be defined within side panels 180 within exhaust duct 200, e.g., such that heated flows from below baking stone 120 may be drawn around cooking chamber 110 for discharge through exhaust duct 200.

As best shown in FIGS. 2 and 3, front wall 206 of cooking chamber 110 may define one or more exhaust outlets 210 through which the combined flow of exhaust air may exit exhaust duct 200. Specifically, according to the illustrated embodiment, casing 130 defines a discharge plenum 190 that is defined by casing 130, e.g., such that it is contiguous with or a portion of air plenum 140. Exhaust fumes from exhaust duct 200 may enter discharge plenum 190 through exhaust outlets 210 before being discharged from oven appliance 100.

Discharge plenum 190 extends between an entrance 192 (which according to the illustrated embodiment coincides with exhaust outlets 210) and a discharge vent 146. Entrance 192 of discharge plenum 190 is positioned at or proximate cooking chamber 110 of housing 102, e.g., over opening 112 along the vertical direction V. Thus, entrance 192 of discharge plenum 190 may be contiguous with cooking chamber 110 of housing 102, e.g., via exhaust duct 200, through which cooking fumes and/or smoke from cooking chamber 110 of housing 102 may enter and flow into discharge plenum 190 at entrance 192 of discharge plenum 190.

According to example embodiments, discharge vent 146 of discharge plenum 190 is positioned above entrance 192 of discharge plenum 190, e.g., along the vertical direction V. Discharge vent 146 of discharge plenum 190 is positioned such that discharge vent 146 of discharge plenum 190 is contiguous with the interior room ambient atmosphere about housing 102 and/or exposed to the interior room ambient atmosphere about housing 102. Thus, cooking fumes and/or smoke from cooking chamber 110 of housing 102 along with other airflows may exit and flow out of discharge plenum 190 at discharge vent 146 of discharge plenum 190. In particular, the cooking fumes and/or smoke from cooking chamber 110 of housing 102 may flow from discharge vent 146 of discharge plenum 190 into the interior room ambient atmosphere about housing 102. Entrance 192 of discharge plenum 190 may also be positioned coplanar with at least a portion of outlet openings 186, e.g., in a plane that is perpendicular to the vertical direction V.

Discharge plenum 190 permits oven appliance 100 to vent cooking fumes and/or smoke into an interior atmosphere of a building housing oven appliance 100. Thus, oven appliance 100 need not include or be coupled to venting ducts that direct cooking fumes and/or smoke to an exterior atmosphere outside of the building housing oven appliance 100. Oven appliance 100 also includes features for treating the cooking fumes and/or smoke within discharge plenum 190, as discussed in greater detail below.

As may be seen in FIGS. 2 through 4, oven appliance 100 includes a catalytic converter 230 which is positioned within exhaust duct 200 for lowering or removing volatile organic compounds (VOCs) from the flow of air/fumes passing therethrough or for otherwise reacting with cooking fumes and/or smoke entering discharge plenum 190 in order to reduce emission of undesirable material from discharge plenum 190. Catalytic converter 230 may generally be any suitable smoke reduction catalyst/system and may be configured and operated in any suitable manner.

As used herein, "catalytic converter" or variations thereof may be used to refer to any component, machine, or device that is configured for removing or lowering volatile organic compounds (VOCs), reactive gases, visible emissions, pollutants, or undesirable compounds from a flow of air and smoke. For example, according to the illustrated embodiment, catalytic converter 230 generally includes a catalytic element 232 and a catalyst heater 234. In general, catalytic element 232 includes a material that causes an oxidation and a reduction reaction. For example, precious metals such as platinum, palladium, and rhodium are commonly used as catalyst materials, though other catalysts are possible and within the scope of the present subject matter. In operation, the catalytic element 232 may combine oxygen ($O_2$) with carbon monoxide (CO) and unburned hydrocarbons to produce carbon dioxide ($CO_2$) and water ($H_2O$). In addition, according to exemplary embodiments, catalytic element 232 may remove nitric oxide (NO) and nitrogen dioxide ($NO_2$).

For example, the catalytic element 232 may include metal or ceramic plates coated with a noble (non-reactive) metal, such as palladium. The ceramic plates of catalytic element 232 may form a honeycomb or other suitable high surface area pattern. As a particular example, catalytic element 232 may include a plurality of coated metallic foil layers with the coating on the plurality of coated metallic foil layers selected to complete combustion of hydrocarbons from cooking chamber 110 of housing 102 into carbon dioxide and water.

As illustrated, catalytic element 232 is positioned within exhaust duct 200 above perforated reflector 204, e.g., along the vertical direction V. In addition, catalytic element 232 is positioned immediately upstream of entrance 192 such that it is between catalyst heater 234 and discharge plenum 190. Moreover, according to the illustrated embodiment, apertures 208 of perforated reflector 204 may be defined toward a rear portion of perforated reflector 204, e.g., upstream of catalytic converter 230. In this manner, the entire flow of exhaust fumes may pass through catalytic converter 230 prior to entering discharge plenum 190.

Notably, catalytic converters typically require that the catalyst be heated to a suitably high temperature in order to catalyze the necessary chemical reactions. Therefore, catalyst heater 234 is in thermal communication with catalytic element 232 for heating it to a suitable temperature, such as approximately 800° F. According to the illustrated embodiment, catalyst heater 234 is positioned upstream of catalytic element 232 to provide thermal energy through convection. However, it should be appreciated that according to alternative embodiments, catalyst heater 234 may be in direct contact with catalytic element 232 to provide thermal energy through conduction or may be thermally coupled to catalytic element 232 in any other suitable manner.

Thus, during operation of oven appliance 100, air handler 144 may entrain or draw gases, such as cooking fumes and/or smoke, into exhaust duct 200, e.g., through perforated reflector 204, through outlet openings 186, etc. The air within air plenum 140 and discharge plenum 190 may mix with cooking fumes and/or smoke flowing through or out of entrance 192 of discharge plenum 190 and thereby assist with cooling the cooking fumes and/or smoke flowing through or out of discharge plenum 190. In such a manner, cooking fumes and/or smoke from cooking chamber 110 flowing through discharge plenum 190 may be cooled by mixing with ambient air from air plenum 140 prior to exiting discharge plenum 190 at discharge vent 146.

In order to measure the level of harmful emissions or VOCs within the cooking fumes and heated air, oven appliance 100 may further include a smoke sensor 240 that is positioned within exhaust duct 200 downstream of catalytic converter 230. For example, smoke sensor 240 may be positioned just upstream of entrance 192 of discharge plenum 190 for ensuring that the fumes entering discharge plenum 190 always remain below a predetermined threshold. In general, smoke sensor 240 may be any suitable device or sensor that detects a level of VOCs within smoke. For example, smoke sensor 240 may be a photoelectric sensor that optically detects VOCs, an ionization smoke detector that uses an ionization reaction, a chemical detector, an opto-chemical sensor, a biomimetic sensor, an electrochemical sensor, a semiconductor sensor, or any other suitable type of sensor for detecting the presence or magnitude of a particular chemical or compound in a volume or flow of smoke.

Oven appliance 100 also includes features for assisting with regulating heating of cooking chamber 110 of housing 102 with upper and lower heating element arrays 132, 134. Oven appliance 100 may also include one or more upper temperature sensors 250 and one or more lower temperature sensors 252. Upper temperature sensor 250 may generally be positioned proximate top portion 124 of cooking chamber 110. Lower temperature sensor 252 may be positioned within baking stone 120, e.g., as shown in FIG. 2. Thus, lower temperature sensor 252 may be embedded within the material of baking stone 120, and temperature measurements from lower temperature sensor 252 may correspond to the temperature of baking stone 120. Lower temperature sensor 252 may be positioned within baking stone 120 at a middle portion of baking stone 120, e.g., along the vertical direction V.

In alternative exemplary embodiments, lower temperature sensor 252 may be positioned within baking stone 120 at or adjacent a top portion and/or a bottom portion of baking stone 120, e.g., along the vertical direction V. As will be understood by those skilled in the art, baking stone 120 may have a relatively low thermal conductivity, such that the temperature of baking stone 120 changes slowly. Thus, positioning lower temperature sensor 252 at a suitable vertical location within baking stone 120 may permit accurate measurement of the temperature of baking stone 120, e.g., at top surface 164 and bottom surface 162 of baking stone 120. In particular, having a lower temperature sensor 252 at both top surface 164 and bottom surface 162 of baking stone 120 may assist with regulating heating of cooking chamber 110 of housing 102.

As used herein, "temperature sensor" or the equivalent is intended to refer to any suitable type of temperature measuring system or device positioned at any suitable location for measuring the desired temperature. Thus, for example, temperature sensors 250, 252 may each be any suitable type of temperature sensor, such as a thermistor, a thermocouple, a resistance temperature detector, a semiconductor-based integrated circuit temperature sensor, etc. In addition, temperature sensors 250, 252 may be positioned at any suitable location and may output a signal, such as a voltage, to a controller that is proportional to and/or indicative of the temperature being measured. Although exemplary positioning of temperature sensors is described herein, it should be appreciated that oven appliance 100 may include any other suitable number, type, and position of temperature, and/or other sensors according to alternative embodiments.

Oven appliance 100 also includes a controller 264 for providing desired functionality for oven appliance 100. For instance, as will be described below, the controller 264 may be configured to control the activation and deactivation of upper and lower heating element arrays 132, 134 in order to regulate heating of cooking chamber 110 with upper and lower heating element arrays 132, 134. For instance, by controlling the operation of the upper and lower heating element arrays 132, 134, the controller 264 may be configured to control the various operating modes of the oven appliance 100, such as baking, roasting, broiling, cleaning and/or any other suitable operations.

It should be appreciated that controller 264 may generally comprise any suitable processor-based device known in the art. Thus, in several embodiments, controller 264 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory of controller 264 may generally comprise memory element (s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory may generally be configured to store suitable computer-readable instructions that, when implemented by the processor(s), configure controller 264 to perform various computer-implemented functions, such as by implementing embodiments of the heating element array operating algorithm disclosed herein. In addition, controller 264 may also include various other suitable components, such as a communications circuit or module, one or more input/output channels, a data/control bus and/or the like.

Turning back to FIG. 1, oven appliance 100 may also include a control panel 260 on casing 130. Control panel 260 may include one or more user-interface elements 262 (e.g., buttons, knobs, etc.) for receiving user inputs associated with controlling the operation of oven appliance 100. For instance, a user may utilize user-interface elements 262 to input a desired oven temperature into controller 264 or otherwise program operation of oven appliance. Controller 264 may then control the operation of oven appliance 100 (e.g., by activating/deactivating one or more of upper heating element array 132 and lower heating element array 134) so as to adjust the internal temperature within cooking chamber 110 of housing 102 to the user-selected temperature and/or to maintain the internal temperature at such user-selected temperature. Similarly, controller 264 may regulate operation of air handler 144, catalytic converter 230, and other portions of oven appliance 100, e.g., to ensure safe operation temperatures, emissions, etc.

Moreover, controller 264 may be communicatively coupled to upper and lower temperature sensors 250, 252, e.g., for monitoring the internal temperature within cooking chamber 110 of housing 102. Specifically, upper and lower temperature sensors 250, 252 may be configured to transmit temperature measurements to controller 264. Controller 264 may then control the operation of the upper heating element array 132 and lower heating element array 134 based on the temperature measurements so as to heat the oven temperature up to and/or maintain such temperature at the user-selected temperature.

Accordingly, controller 264 is in operative communication with upper heating element array 132, lower heating element array 134, upper temperature sensors 250 and lower temperature sensors 252. Controller 264 is configured for independently operating each of upper heating element array 132 and lower heating element array 134. Controller 264 may operate upper heating element array 132 in response to temperature measurements from upper temperature sensor 250 and controller 264 may operate lower heating element array 134 in response to temperature measurements from lower temperature sensor 252. Controller 264 may regulate the power output of upper heating element array 132 and lower heating element array 134 using any suitable method or mechanism. For example, controller 264 may utilize a triode for alternating current (TRIAC) and/or pulse-width modulation of a voltage supplied to a solid state relay to regulate the power output of each of upper heating element array 132 and lower heating element array 134.

Now that the construction of oven appliance 100 and according to exemplary embodiments have been presented, an exemplary method 300 of operating an oven appliance will be described. Although the discussion below refers to the exemplary method 300 of operating oven appliance 100, one skilled in the art will appreciate that the exemplary method 300 is applicable to the operation of a variety of other cooking appliances. In exemplary embodiments, the various method steps as disclosed herein may be performed by controller 264 or a separate, dedicated controller.

Figure 6:
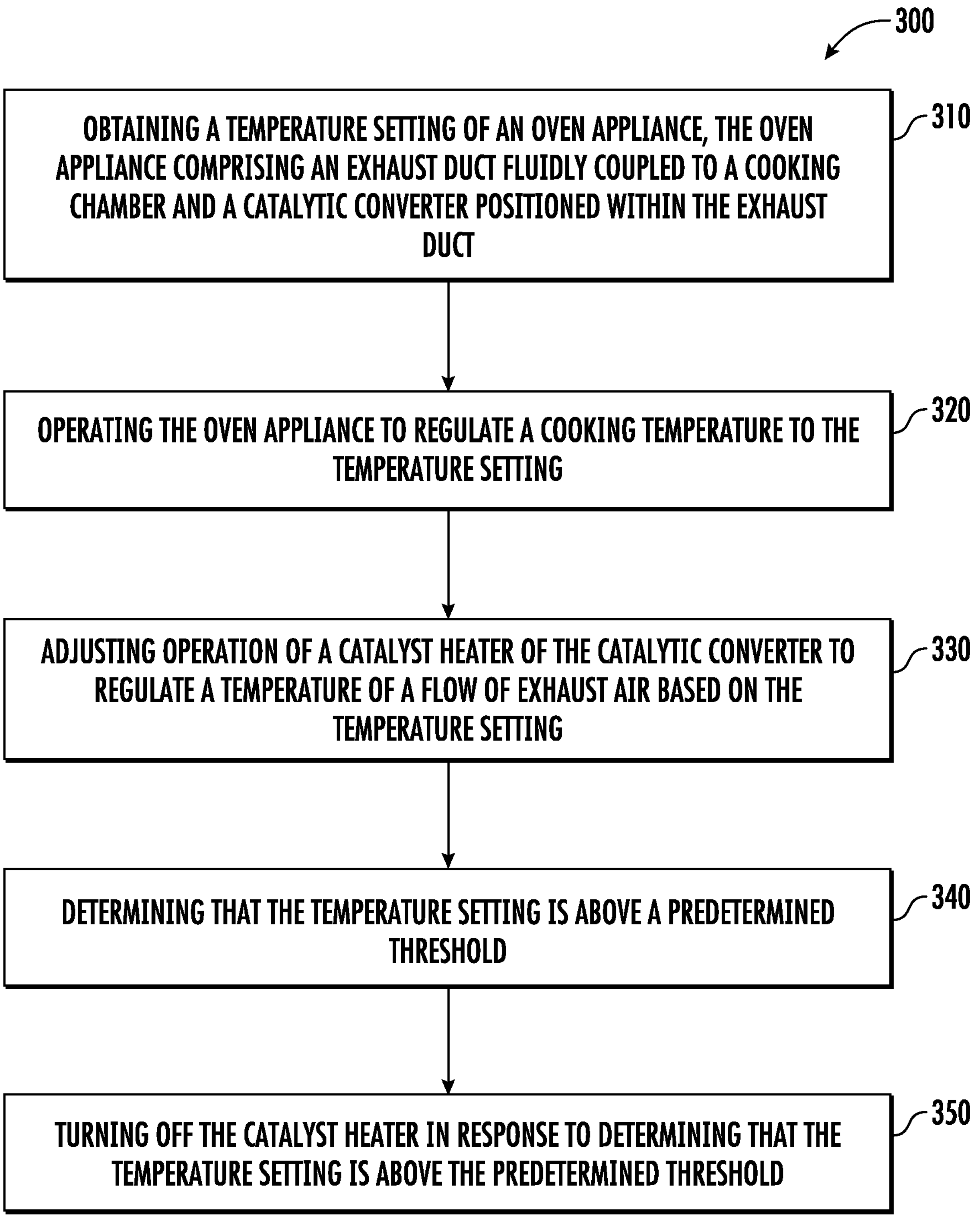
FIG. 6 illustrates a method for operating an oven appliance in accordance with one embodiment of the present disclosure.

Referring now to FIG. 6, method 300 includes, at step 310, obtaining a temperature setting of an oven appliance. For example, continuing the example from above, the temperature setting may be the cooking temperature setting of oven appliance 100. According to example embodiments, the temperature setting may be determined in any suitable manner. For example, the temperature setting may be based on the user input via inputs 262. The temperature setting may also be determined based on a power setting of one or both of upper heating element array 132 or lower heating element array 134. According to still other embodiments that temperature setting may be determined based on feedback from one or more temperature sensors, e.g., such as temperature sensors 250, 252. According to still other exemplary embodiments, the temperature setting may be deduced based on VOC levels detected by smoke sensor 240, e.g., with the presumption that higher VOC levels may indicate that the temperature of air flowing through the catalytic element 232 is too low. The temperature settings may also be determined by a preset cooking menu, for example, "New York Pizza" or "Chicago Deep Dish Pizza."

Step 320 includes operating the oven appliance to regulate a cooking temperature based on the temperature setting. For example, controller 264 may use the temperature setting to determine and control operational settings for upper heating element array 132 and/or lower heating element array 134. In addition, controller 264 may control the operation of various other system components based on the temperature setting determined from step 310, e.g., such as the operation of air handler 144 and catalytic converter 230, as described in more detail herein according to example embodiments of the present subject matter.

For example, step 330 may include adjusting operation of the catalyst heater based on the temperature setting. In this regard, as noted above, the catalytic element 232 may have a desirable operating temperature range that results in ideal functioning and elimination of visible contaminants from exhaust air. By adjusting the operation of the catalyst heater 234, the temperature of the exhaust air may be adjusted for improved overall operation of catalytic converter 230 and oven appliance 100. The adjustments made to the operation of catalyst heater 234 may vary depending on the application, but exemplary adjustments are described below that are in no way intended to limit the scope of the present subject matter.

For example, adjusting operation of the catalyst heater comprises adjusting an operating duty cycle of the catalyst heater. For example, the operating duty cycle may be selected based on known operating characteristics (e.g., via lookup table) to achieve desired supplemental air heating so that the flow of air passing through catalytic element 232 is the desired temperature. According to example embodiments, the power level of the catalyst heater may be selected such that it is inversely proportional to the temperature setting. In this regard, if the temperature setting is very high, the temperature of the exhaust air may need less heating from the catalyst heater 234, and vice versa (see, e.g., FIG. 5).

Figure 5:
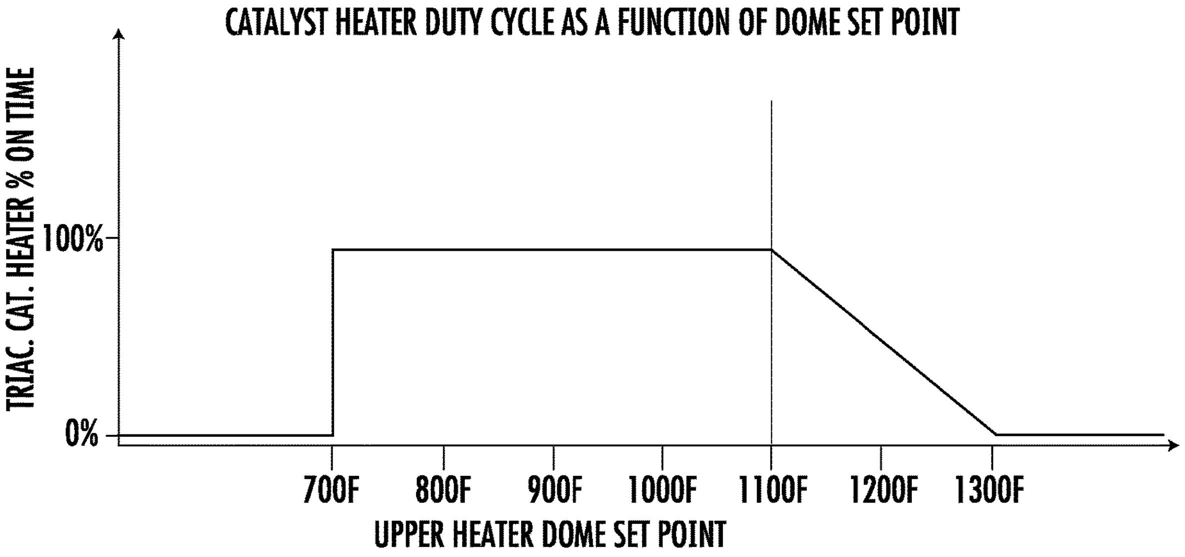
FIG. 5 provides a plot of the operation of a catalyst heater over a cooking chamber setpoint of the exemplary oven appliance of FIG. 1 according to an exemplary embodiment of the present subject matter.

According to example embodiments, adjusting the operation of the catalyst heater based on the temperature setting may include determining that the temperature setting is within a predetermined temperature range, obtaining a power level of the catalyst heater using the temperature setting and a lookup table, and operating the catalyst heater at the power level. For example, as best shown in FIG. 5, an example operating profile of the catalyst heater 234 is provided. As shown, the operation of the catalyst heater 234 may vary depending on the temperature setting. As shown, the relationship between the temperature setting is nonlinear within this range, though any suitable relationship may be used depending on the application. As shown, the predetermined temperature range may be between about 200° F. and 2000° F., between about 400° F. and 1600° F., between about 600° F. and 1400° F., or between about 700° F. and 1300° F.

Step 340 may include determining that the temperature setting is above a predetermined threshold and step 350 may include turning off the catalyst heater in response to determining that the temperature setting is above the predetermined threshold. For example, as shown in FIG. 5, once the temperature setting exceeds a certain temperature threshold (e.g., 1300° F.), the catalyst heater 234 may turn off completely as supplemental heating is no longer needed for appropriate VOC removal. It should be appreciated that the predetermined threshold may vary depending on the application. For example, the predetermined threshold may be about 600° F., 700° F., 900° F., 1000° F., 1100° F., 1200° F., 1300° F., 1400° F., or greater.

FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 300 are explained using oven appliance 100 as an example, it should be appreciated that this method may be applied to the operation of any cooking appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance defining a vertical direction, a lateral direction, and a transverse direction, the oven appliance comprising:
- a housing defining a discharge vent;
- a cooking chamber positioned within the housing;
- an exhaust duct providing fluid communication between cooking chamber and the discharge vent;
- an air handler operably coupled with the exhaust duct for urging a flow of heated air from the cooking chamber, through the exhaust duct, and out of the discharge vent;
- a catalytic converter assembly comprising:
  - a catalytic element positioned within the exhaust duct for lowering volatile organic compounds from the flow of heated air; and
  - a catalyst heater positioned upstream of the catalytic element for selectively heating the flow of heated air; and
- a controller in operative communication with the catalyst heater, the controller being configured to:
  - obtain a temperature setting of the oven appliance; and
  - adjust operation of the catalyst heater based on the temperature setting, wherein adjusting operation of the catalyst heater comprises adjusting an operating duty cycle of the catalyst heater.

2. The oven appliance of claim 1, wherein the temperature setting is a setting of an upper heating assembly of the oven appliance.

3. The oven appliance of claim 1, wherein the controller is further configured to:
- determine that the temperature setting is above a predetermined threshold; and
- turn off the catalyst heater in response to determining that the temperature setting is above the predetermined threshold.

4. The oven appliance of claim 3, wherein the predetermined threshold is 1300 degrees Fahrenheit.

5. The oven appliance of claim 1, wherein adjusting operation of the catalyst heater based on the temperature setting comprises:
- determining that the temperature setting is within a predetermined temperature range;
- obtaining a power level of the catalyst heater using the temperature setting and a lookup table; and
- operating the catalyst heater at the power level.

6. The oven appliance of claim 5, wherein the predetermined temperature range is between 700 degrees Fahrenheit and 1300 degrees Fahrenheit.

7. The oven appliance of claim 1, wherein adjusting operation of the catalyst heater based on the temperature setting comprises:
- selecting a power level of the catalyst heater that is inversely proportional to the temperature setting.

8. The oven appliance of claim 1, further comprising:
- a smoke sensor positioned within exhaust duct downstream of the catalytic converter assembly; and
- a controller in operative communication with the smoke sensor, the controller being configured to:
- detect a level of volatile organic compounds (VOCs) in the flow of heated air; and
- adjust operation of the catalyst heater based on the level of volatile organic compounds (VOCs) in the flow of heated air.

9. The oven appliance of claim 1, further comprising:
- a temperature sensor positioned within exhaust duct; and
- a controller in operative communication with the temperature sensor, the controller being configured to:
- detect a temperature of the flow of heated air; and
- adjust operation of the catalyst heater based on the temperature of the flow of heated air.

10. The oven appliance of claim 1, wherein the exhaust duct is positioned above the cooking chamber and is defined at least in part by a top wall of the cooking chamber and a perforated reflector positioned within a top portion of the cooking chamber.

11. The oven appliance of claim 1, further comprising:

a discharge plenum, wherein the air handler is positioned within the discharge plenum and the exhaust duct is fluidly coupled to the discharge plenum; and a cooling air duct positioned at a lateral side of the cooking chamber, the cooling air duct extending between an entrance positioned at a back side of the oven appliance and an exit positioned at a front portion of the cooking chamber, the exit of the cooling air duct being in fluid communication with the discharge plenum.

12. The oven appliance of claim 1, wherein the catalyst heater is positioned upstream of the catalytic element within the exhaust duct.

13. An oven appliance defining a vertical direction, a lateral direction, and a transverse direction, the oven appliance comprising:

a housing defining a discharge vent;

a cooking chamber positioned within the housing;

an exhaust duct providing fluid communication between cooking chamber and the discharge vent;

an air handler operably coupled with the exhaust duct for urging a flow of heated air from the cooking chamber, through the exhaust duct, and out of the discharge vent;

a catalytic converter assembly comprising:

a catalytic element positioned within the exhaust duct for lowering volatile organic compounds from the flow of heated air; and a catalyst heater positioned upstream of the catalytic element for selectively heating the flow of heated air; and a controller in operative communication with the catalyst heater, the controller being configured to:

obtain a temperature setting of the oven appliance; and adjust operation of the catalyst heater based on the temperature setting, wherein adjusting operation of the catalyst heater based on the temperature setting comprises selecting a power level of the catalyst heater that is inversely proportional to the temperature setting.

14. A method of operating an oven appliance, the oven appliance comprising a cooking chamber, an exhaust duct fluidly coupled to the cooking chamber, an air handler operably coupled with the exhaust duct, a catalytic element positioned within the exhaust duct, and a catalyst heater positioned upstream of the catalytic element, the method comprising:

obtaining a temperature setting of the oven appliance; and adjusting operation of the catalyst heater based on the temperature setting, wherein adjusting operation of the catalyst heater based on the temperature setting comprises:

determining that the temperature setting is within a predetermined temperature range;

obtaining a power level of the catalyst heater using the temperature setting and a lookup table; and operating the catalyst heater at the power level.

15. The method of claim 14, wherein adjusting operation of the catalyst heater comprises adjusting an operating duty cycle of the catalyst heater.

16. The method of claim 14, further comprising:

determining that the temperature setting is above a predetermined threshold; and turning off the catalyst heater in response to determining that the temperature setting is above the predetermined threshold.

17. The method of claim 14, wherein adjusting operation of the catalyst heater based on the temperature setting comprises:

selecting a power level of the catalyst heater that is inversely proportional to the temperature setting.

* * * * *